(12) United States Patent
Heyl

(10) Patent No.: US 7,650,763 B2
(45) Date of Patent: Jan. 26, 2010

(54) AIR CONDITIONING UNIT, OPERATABLE WITH CARBON DIOXIDE, FOR VEHICLES AND METHOD FOR OPERATING THE AIR CONDITIONING UNIT

(75) Inventor: Peter Heyl, Cologne (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 247 days.

(21) Appl. No.: 11/691,535

(22) Filed: Mar. 27, 2007

(65) Prior Publication Data
US 2007/0220915 A1  Sep. 27, 2007

(30) Foreign Application Priority Data
Mar. 27, 2006  (DE)  .................. 10 2006 014 430
Feb. 7, 2007  (DE)  .................. 10 2007 006 993

(51) Int. Cl.
  *F25B 13/00*  (2006.01)
(52) U.S. Cl. ........................ 62/324.1; 62/510
(58) Field of Classification Search ............... 62/324.1, 62/324.6, 510
See application file for complete search history.

(56) References Cited

U.S. PATENT DOCUMENTS

| | | | | |
|---|---|---|---|---|
| 4,903,495 A | * | 2/1990 | Howland et al. | 62/81 |
| 5,235,820 A | * | 8/1993 | Radermacher et al. | 62/114 |
| 5,689,962 A | * | 11/1997 | Rafalovich | 62/90 |
| 6,568,197 B2 | * | 5/2003 | Uno et al. | 62/175 |
| 6,928,831 B2 | * | 8/2005 | Heyl | 62/324.1 |
| 7,069,726 B2 | * | 7/2006 | Frutschi | 60/772 |

OTHER PUBLICATIONS

Lorentzen, Gustav; The Use of Natural Refrigerants; Proceedings of Conference on New Application of Natural Working Fluids in Refrigeration and Air Conditioning, 10-13, 5.94, 23/26.

* cited by examiner

*Primary Examiner*—Melvin Jones
(74) *Attorney, Agent, or Firm*—Fraser Clemens Martin & Miller LLC; J. Douglas Miller

(57) ABSTRACT

An air conditioning unit for vehicles with work-doing expansion of the carbon dioxide is provided, the air conditioning unit including a combined refrigeration and heat pump circuit, wherein the air conditioning unit is switchably configured to change a flow direction of a refrigerant for switchable operation from the refrigeration circuit to the heat pump circuit. A method for operating the air conditioning unit is also provided.

19 Claims, 7 Drawing Sheets

AIR CONDITIONING UNIT, OPERATABLE WITH CARBON DIOXIDE, FOR VEHICLES AND METHOD FOR OPERATING THE AIR CONDITIONING UNIT

CROSS-REFERENCE TO RELATED APPLICATIONS

This application claims priority to German Provisional Patent Application No. 10 2006 014 430.9, filed Mar. 27, 2006, and German Non-Provisional Patent Application No. 10 2007 006 993.8, filed Feb. 7, 2007, the entire disclosures of which are incorporated herein by reference.

FIELD OF THE INVENTION

The invention relates to an air conditioning unit, operatable with carbon dioxide, for vehicles and a method for operating the air conditioning unit with the carbon dioxide doing work during expansion.

BACKGROUND OF THE INVENTION

A transcritical process traditionally used in automobile air conditioning applications (solid lines, process B) is given in a pressure/enthalpy diagram shown in FIG. 2, whereby the process is described by a compression (state 1"-state 2"), a heat output to an external heat ex-changer (state 2"-state 3"), the high-pressure side of an internal heat exchanger (state 3"-state 4"), an irreversible isenthalpic expansion (state 4"-state 5"), an internal heat exchanger (state 5"-state 6"), and the low-pressure side of the internal heat exchanger (state 6"-state 1").

A problem is that at high ambient temperatures the coefficient of performance of the process decreases relatively distinctly compared with current refrigerants, or the alternatives thereof.

The thermodynamic analysis of the process indicates that a work-doing expansion of the carbon dioxide can, depending on the design, at least compensate for the disadvantage. To achieve this, the irreversible expansion 4"-5" is replaced with a reversible expansion doing work (schematically, from 5'-6').

Such an air conditioning unit 1, operatable with carbon dioxide, for mobile applications is described in DE 19841686 C2, DE 10013191 C1, and DE 10220391 A1, whereby refrigeration/air conditioning units are given having an expansion machine in form of a toothed gear machine. The embodiments are one-stage refrigerant processes, whereby the air conditioning unit includes a carbon dioxide based refrigerant circuit which includes, in direction of flow, a compressor, a gas cooler or liquefier, an expansion machine in form of a toothed gear machine (externally toothed, helically toothed), and an evaporator, the components connected to each other through lines. In the refrigerant circuit, the carbon dioxide is expanded doing work into the two-phase region, whereby the starting point of the expansion may be supercritical or subcritical. Depending on the ambient temperature, the unit can be operated in the air conditioning mode or heat pump mode. The energy obtained during the expansion process of the toothed gear machine by the work-doing expansion is used as, for example, mechanical or electrical power to drive the compressor. The mechanical integration into the main compressor is relatively expensive and the efficiency chain is critical for the conversion into electrical power.

Another transcritical process traditionally used in stationary refrigeration/air conditioning applications, according to the state-of-the-art, is given in a pressure/enthalpy diagram, FIG. 2, (dashed lines, process A) whereby the process is described by a compression (state 1'-state 2'), a heat output to a first external heat exchanger (state 2'-state 3'), a subsidiary compressor stage (state 3' to 4'), a second external heat exchanger (state 4' to 5'), an expansion stage 5' to 6', directly driving the subsidiary compressor stage, and an internal heat exchanger (state 5'-state 6').

Such an air conditioning unit 1, operatable with carbon dioxide, for stationary applications, according to FIG. 1, is described in DE 19813220 C2 but is different in that an expansion-compression machine is provided established as a free piston machine. The expansion-compression machine given therein is, as to DE 10242271 B3, further developed in that the expansion is configured multi-stage with the configuration of the free piston machine maintained. The air conditioning unit 1 includes a main compressor 2, a first external heat exchanger 3, a subsidiary compressor 4, a second external heat exchanger 5 and an expansion machine 6, and an internal heat exchanger 7. They are connected to each other, in this order, to build a circuit 8 for the carbon dioxide. The expansion ma-chine 6 and the subsidiary compressor 4 are configured as an expansion-compression machine 9. The expansion-compression machine 9 is a piston-type expansion machine configured to the free piston design, with work-doing expansion of the carbon dioxide, the energy of which is used to compress the carbon dioxide in the high-pressure stage of the expansion-compression machine 9. A multi-stage expansion is provided, whereby the expansion can be managed to occur using several expansion machines with double-acting cylinders, whereby the pistons of the expansion machines are mechanically linked through a piston rod to the piston of the subsidiary compressor 4. The work-doing expansion occurs in the expansion machine 6, the compression in the high-pressure stage of the subsidiary compressor 4 provided. The working principle of the refrigeration unit 1 is that the carbon dioxide is simultaneously subjected to a work-doing expansion in the expansion machines 6 and a compression in the subsidiary compressor 4.

A problem is that the use of the described expansion-compression machine in mobile applications such as automobiles implies assembly and operation complications due to the design and the dimensions resulting therefrom, as the automobile industry aims at the miniaturization of the automobile components.

A refrigeration machine with a second compressor stage is described in Lorentzen, G.: The use of natural refrigerants—a complete solution to the CFC/HCFC predament, Proceedings of conference New Application of Natural Working Fluids in Refrigeration and Air Conditioning, Hannover, 10-13.5.94, 23/36, whereby the air conditioning unit contains a first compressor, a first gas cooler, a second compressor, a second gas cooler, an expansion machine and an evaporator, which are connected in series to each other forming a closed refrigeration circuit. The compressor and expansion machine, both configured as piston machines, are connected to a drive motor and are driven by said motor.

In DE 102005017623 A1, only the increase of the specific refrigeration output is used with the expansion doing work. The mechanical expansion work available is transformed into friction heat which heats the refrigerant circuit. Using this method improves the coefficient of performance in the air conditioning mode, whereas the high potential of work-doing expansion is not utilized.

SUMMARY OF THE INVENTION

The invention is based on the problem to describe an air conditioning unit operatable with carbon dioxide for vehicles as well as a process for operating the air conditioning unit that are established suitable to obtain an expansion-compression machine to be configured compact for the air conditioning unit of the vehicle and ensure the expansion-compression machine to be adapted to the thermodynamic conditions of a refrigeration and a heat pump circuit. The operational pressures of current air conditioning units should not be exceeded.

The problem is solved by an air conditioning unit for vehicles, the unit being operatable with carbon dioxide, with the carbon dioxide doing work while expanding, the energy thereof serving to compress the carbon dioxide in a second compressor stage, includes at least a main compressor to compress from low pressure to medium pressure in form of a first compressor stage, a first external heat exchanger, a subsidiary compressor to compress from medium pressure to high pressure in form of the second compressor stage, a second external heat exchanger, an expansion machine, and an internal heat exchanger, which are connected to each other, in this order, to form a circuit working in refrigeration mode, whereby the expansion machine and the subsidiary compressor form an expansion-compression machine, whereby the air conditioning unit is configured switchable concerning circuits passed by carbon dioxide in opposite directions—the refrigeration circuit and a heat pump circuit—, and Alternating passage depending on the circuit specified in each case is assigned to the expansion machine, whereby inlet and outlet are exchanged depending on the circuit,
  Alternating passage depending on the specified circuit is assigned to the subsidiary compressor, which is driven by the expansion machine, whereby inlet and outlet are exchanged depending on the circuit,
  Different pressure levels are assigned to the external heat exchangers depending on the circuit specified, whereby an assigned volume/density ratio of the compression to the expansion within the expansion-compression machine is specified.

The expansion-compression machine is adjusted to the main compressor of the air conditioning unit of the vehicle (mass flow) and to the operational parameters (high pressure maximum approx. 140 bars) of automobile CO2-refrigerant circuits of the state-of-the-art. Calculations of maximum possible coefficients of performance yielded high pressures clearly above systems of today. It is the goal of the invention to adapt the expansion-compression machine such that the specified operation pressures will not be exceeded.

At least one further expansion-compression machine or expansion machine can be inserted into the air conditioning unit.

The internal heat exchanger functions as an evaporator in the refrigeration circuit and a heater in the heat pump circuit.

The expansion machine and the subsidiary compressor can be established to be full pressure machines, whereby The expansion machine works at full pressure and the subsidiary compressor is loaded with a volume changing work, or
  The expansion machine is loaded with a volume changing work and the subsidiary compressor works at full pressure, or
  Both the expansion machine and the subsidiary compressor are loaded with a volume changing work.

At the expansion-compression machine adapted to the air conditioning unit of the vehicle, the following density ratios
  in the range from 0.4 to 0.54, or
  in the range from 0.55 to 0.8, or
  in the range from 0.6 to 0.675 for a tight expansion-compression machine with a volumetric efficiency $\lambda=1$, or accordingly corrected, if the volumetric efficiency is different from $\lambda=1$, can be set.

The subsidiary compressor and the expansion machine can be configured as rotating or oscillating displacement machines, preferably as rotary piston machines with inner shaft, which have opposite directions of rotation according to the given direction of flow of the carbon dioxide, whereby the expansion machine and the subsidiary compressor at different ambient temperatures are configured switchable concerning the carbon dioxide flow direction and are provided for switchable operation from a refrigeration circuit to a heat pump circuit and vice versa, whereby the ratio of density and volume between the expansion machine and the subsidiary compressor is specified.

The rotating displacement machine, preferably a rotary piston machine with inner shaft, can have the form of displacing geometries in a casing, with which the opposite direction of rotation can be reached depending on the direction of flow passage provided in the circuit.

The expansion machine and the subsidiary compressor present in the expansion-compression machine can be connected to each other through a common shaft.

The expansion-compression machine consisting of the expansion machine and the subsidiary compressor can be established within a casing.

Assigned to the main and subsidiary compressors are feeding lines which are provided with valves, optionally controllable valves so that, depending on refrigerant circuit and heat pump circuit, flow passage through the main compressor or subsidiary compressor is performable, whereby the valves optionally are, at least communicatively connected to a control device.

In the heat pump circuit, in addition to the existing expansion-compression machine, at least one additional subsidiary compression stage can be optionally provided in the expansion-compression machine, the stage being used for both the supercritical and, optionally, subcritical operation.

On the other hand, also in the heat pump circuit, in addition to the existing expansion-compression machine, at least one additional expansion stage can be optionally provided in the expansion-compression machine, the stage being used for both the supercritical and, optionally, subcritical operation.

Finally, in the heat pump circuit, in addition to the existing expansion-compression machine, additional throttling cross-sections can be used in parallel to the expansion or subsidiary compressor stage in the expansion-compression machine, the throttling cross-sections being used for both the supercritical and, optionally, subcritical operation.

During each mode of operation, the external heat exchanger can be divided into a medium-pressure and a high-pressure part.

It follows from the description that the external heat exchanger is a compact module, which can consist of a medium-pressure and/or high-pressure part of the external heat exchanger, the expansion-compression machine, and an inner heat exchanger/accumulator, or accumulator, respectively, (explained later) and is loaded with air, or the refrigeration circuit, respectively, of the vehicle.

Because of the expansion at the external heat exchanger, the expanded cold refrigerant has to be transported to the evaporator with the heat input as small as possible. That is achieved by that a double pipe (coaxial pipe) is used which includes two refrigerant flows at low pressure, whereby the expanded refrigerant from the external heat exchanger preferably flows in the interior while the refrigerant coming from the evaporator is enveloped. The coaxial pipe is not primarily intended to transfer heat between both refrigerant flows, but to keep the heat input from the outside as small as possible.

Further, it results for the external heat exchanger that because of the low final compression temperatures particularly after the second compression stage, the heat is not released to the ambient air, but is integrated into low-pressure or high-pressure refrigeration circuits provided in future automobiles. The following scenarios are conceivable:
a) 3 in the high-temperature circuit and 5 in the low-temperature circuit,
b) 3 and 5 in the low-temperature circuit,
c) 3 and 5 in the high-temperature circuit,
d) 3 in the low-temperature circuit and 5 in the high-temperature circuit.

Also the transmission of the heat to the ambient air in the heat exchanger 3 (and/or 5) and the transmission of the heat to a refrigeration circuit in the respective other heat exchanger 3 (and/or 5) are conceivable.

It results for the configuration of the expansion-compression machine that the machine can be placed relatively independently as a compact unit in the engine compartment, preferably near to the evaporator unit, combined with only the high-pressure heat exchanger.

The main compressor can be optionally provided with a mechanical and/or electric drive.

The air conditioning unit can be provided with an inner heat exchanger (IHX in the following) which is, on the one hand, integrated into the line train between the main compressor and the internal heat exchanger and, on the other hand, into the line train between the second external heat exchanger and the expansion machine. Hereby, an efficiency of 5 to 50% of the IHX is aimed at, distinctly below current $CO_2$-units. In this case the internal heat exchanger, compared with the process B, is intended to reduce the mass flow a little. In the process B, the IHX is intended to provide the required refrigeration capacity at high ambient temperatures and significantly reduce the optimal high pressure at the maximum coefficient of performance.

In a method for operating an air conditioning unit for vehicles, which is operatable with carbon dioxide, for a process with work-doing expansion of the carbon dioxide, the energy of which functions to compress the carbon dioxide in a high-pressure stage, the refrigeration circuit, regarding the flow course of the carbon dioxide, is carried out in the following steps:
  Compression of the carbon dioxide by means of the drive of the main compressor,
  Passage of the compressed carbon dioxide through the first external heat exchanger, which works as medium-pressure gas cooler releasing heat,
  Passage of the carbon dioxide through the subsidiary compressor, which is mechanically driven by the expansion machine and in the second compression stage, works as compressor,
  Passage of the carbon dioxide through the second external heat exchanger, which works as high-pressure gas cooler,
  Passage of the carbon dioxide through the expansion machine, where the expansion occurs which is directly used work-doing to drive the subsidiary compressor, and
  Passage of the carbon dioxide through the integrated internal heat exchanger, which works as evaporator, whereby the main compressor, the first external heat exchanger, the subsidiary compressor, the second external heat exchanger, the expansion machine, and the internal heat exchanger, in this order, are connected and passed by the flow.

In a method for operating an air conditioning unit for vehicles, which is operatable with carbon dioxide, for a process with work-doing expansion of the carbon dioxide the energy of which functions to compress the carbon dioxide in a high-pressure stage, the heat pump circuit, regarding the flow course of the carbon dioxide, is carried out in the following steps:
  Compression of the carbon dioxide by means of the drive of the main compressor, which as part of the first compression stage has the same function as in refrigeration mode and where the same direction of flow of the carbon dioxide exists as in refrigeration mode,
  Passage of the compressed carbon dioxide through the internal heat exchanger in opposite direction compared with the refrigeration circuit, which works as heater,
  Passage of the carbon dioxide through the expansion machine in opposite direction, whereby inlet and outlet are exchanged and also in the expansion machine an expansion occurs, which is directly used work-doing to drive the subsidiary compressor,
  Passage of the carbon dioxide through the second external heat exchanger, which works as low-pressure evaporator taking heat from the environment,
  Passage of the carbon dioxide through the subsidiary compressor, which works as precompressor for the first stage in the two-phase region, and
  Passage of the carbon dioxide through the external heat exchanger, which works as medium-pressure evaporator and also takes heat from the environment, whereby the main compressor, the internal heat exchanger, the expansion machine, the second external heat exchanger, the subsidiary compressor, and the first external heat exchanger, in this order, are connected and passed by the flow.

In some examples of the state-of-the-art, a heater is provided for the heat pump circuit in addition to the internal heat exchanger. In this case, the internal heat exchanger is always an evaporator. This special design is not dealt with, but can be realized using this invention.

In the design mentioned above, also an IHX can be integrated, on the one hand, into the line train between the main compressor and the internal heat exchanger and, on the other hand, into the line train between the second external heat exchanger and the expansion machine.

In both circuits the inlet and the outlet of the expansion machine can change because of the changed direction of the carbon dioxide flow, whereby the two external heat exchangers in both circuits work at different pressure levels, whereby the first external heat exchanger, in the refrigeration circuit, works as medium-pressure gas cooler which releases heat to the environment and in the heat pump circuit, works as medium-pressure evaporator which takes heat from the environment, while the second external heat exchanger, in the refrigeration mode, works as high-pressure gas cooler which releases heat to the environment and in the heat pump circuit, works as low-pressure evaporator which takes heat from the environment.

Hereby the expansion-compression machine is adjusted to the process parameters—temperature and refrigerant flow—of the vehicle's air conditioning unit.

To realize the method a volume/density ratio between compression and expansion is specified, whereby the maximum achievable coefficient of performance, or the deviation of the coefficient of performance from a maximum achievable coefficient of performance—COPmax—and an acceptable high pressure within the range of the maximum high pressure of the vehicle's air conditioning unit are leading parameters, whereby as COP-value the value of the ratio of heat output to electric and/or mechanical driving energy input inclusive of the auxiliary energy, at specified ambient temperatures at specified times is defined.

The change of the density as the ratio of the outlet density to the inlet density of the carbon dioxide in the subsidiary compressor can be in the range of between 1.0 and 1.3, particularly of between 1.05 and 1.20, more specifically of between 1.08 and 1.15, particularly applying for the subsidiary compressor with and without changing inner volume.

The density/area ratio between compression/expansion can be set at values of 0.40 to 0.54 and 0.55 to 0.8 for a supercritical operation at a gas cooler outlet temperature of between 30° C. to 70° C., particularly at values of 0.6 to 0.675, whereby the values for a tight expansion-compression machine with a volumetric efficiency of $\lambda=1$, or corrected for an adapted expansion-compression machine with a volumetric efficiency different from $\lambda=1$, are provided.

The second compressor stage can optionally operate also in the two-phase region.

In the subcritical refrigeration circuit, the density ratio of the supercritical process can be adopted.

The work-doing expansion can optionally be carried out completely, incompletely or to the full pressure principle.

By exchange of the inlet and outlet of the expansion-compression machine, the expansion-compression machine can be configured such that the subsidiary compressor of the expansion-compression machine is optionally operated as compressor or expansion machine, whereby the same applies to the expansion machine, which works as both expansion machine or compressor as well, which is carried out either by means of a combined toothed gear machine or by means of other rotating/oscillating machines, which block up the working space by rotating or oscillating, and by means of a provided density ratio between compressor and expansion machine, whereby the density ratio is adjusted such that optionally the refrigeration circuit or the heat pump circuit is selectable, whereby as working space of the toothed gear machines the volume of the toothed gears is defined in each case.

The invention relates to an air conditioning unit, which can be operated with carbon dioxide, for vehicles and a method for operating the air conditioning unit with the carbon dioxide doing work while expanding.

The problem is to ensure the adaptation to the thermodynamic conditions of a refrigeration circuit and a heat pump circuit in the air conditioning unit of a vehicle.

In one embodiment, an air conditioning unit is provided comprising: a combined refrigeration and heat pump circuit, wherein the air conditioning unit is switchably configured to change a flow direction of a refrigerant for switchable operation from the refrigeration circuit to the heat pump circuit. The refrigeration and heat pump circuit further comprise: at least a main compressor adapted for a compression of the refrigerant from a low pressure to a medium pressure in a first compression stage; a first external heat exchanger in fluid communication with the main compressor; a subsidiary compressor in fluid communication with the first external heat exchanger and adapted for a compression of the refrigerant from the medium pressure to a high pressure in a second compression stage, an inlet and an outlet of the subsidiary compressor exchanged depending on the refrigeration and heat pump circuit desired; a second external heat exchanger in fluid communication with the subsidiary compressor, wherein different pressure levels are assigned to the external heat exchangers depending on the refrigeration and heat pump circuit desired; an expansion machine in fluid communication with the second external heat exchanger, wherein the expansion machine and the subsidiary compressor form an expansion-compression machine, an inlet and an outlet of the expansion machine exchanged depending on the refrigeration and heat pump circuit desired, and wherein an assigned volume/density ratio of the compression to the expansion within the expansion-compression machine is prespecified; and an internal heat exchanger providing fluid communication between the expansion machine and the main compressor.

In a further embodiment, a method for operating an air conditioning unit, the air conditioning unit having a main compressor, a first external heat exchanger, a subsidiary compressor, a second external heat exchanger, an expansion machine, and an internal heat exchanger in communication with each other and forming a refrigeration circuit and a heat pump circuit is provided. The method comprises at least one of: operating the refrigeration circuit and operating the heat pump circuit. The operation of the refrigeration circuit includes the steps of: 1) compressing the carbon dioxide by means of the drive of the main compressor; 2) passing the compressed carbon dioxide through the first external heat exchanger, which works as a medium-pressure gas cooler releasing heat; 3) passing the carbon dioxide through the subsidiary compressor, which is driven by the expansion machine and, in the second compression stage, works as a compressor; 4) passing the carbon dioxide through the second external heat exchanger, which works as a high-pressure gas cooler; 5) passing the carbon dioxide through the expansion machine, where the work-doing expansion occurs which is directly used to drive the subsidiary compressor; and 6) passing the carbon dioxide through the integrated internal heat exchanger, which works as evaporator. The operation of the heat pump circuit includes the steps of: 1) compressing the carbon dioxide by means of the drive of the main compressor; 2) passing the compressed carbon dioxide through the internal heat exchanger in opposite direction compared to a direction of flow through the refrigeration circuit, wherein the internal heat exchanger operates as a heater; 3) passing the carbon dioxide through the expansion machine in opposite direction compared to the direction of flow through the refrigeration circuit, whereby inlet and outlet are exchanged and also in the expansion machine an expansion occurs, which is directly used work-doing to drive the subsidiary compressor; 4) passing the carbon dioxide through the second external heat exchanger, which works as a medium-pressure evaporator; 5) passing the carbon dioxide through the subsidiary compressor, which works as a precompressor for a first stage in a two-phase region; and 6) passing the carbon dioxide through the external heat exchanger, which works as low-pressure evaporator and also takes heat from the environment.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
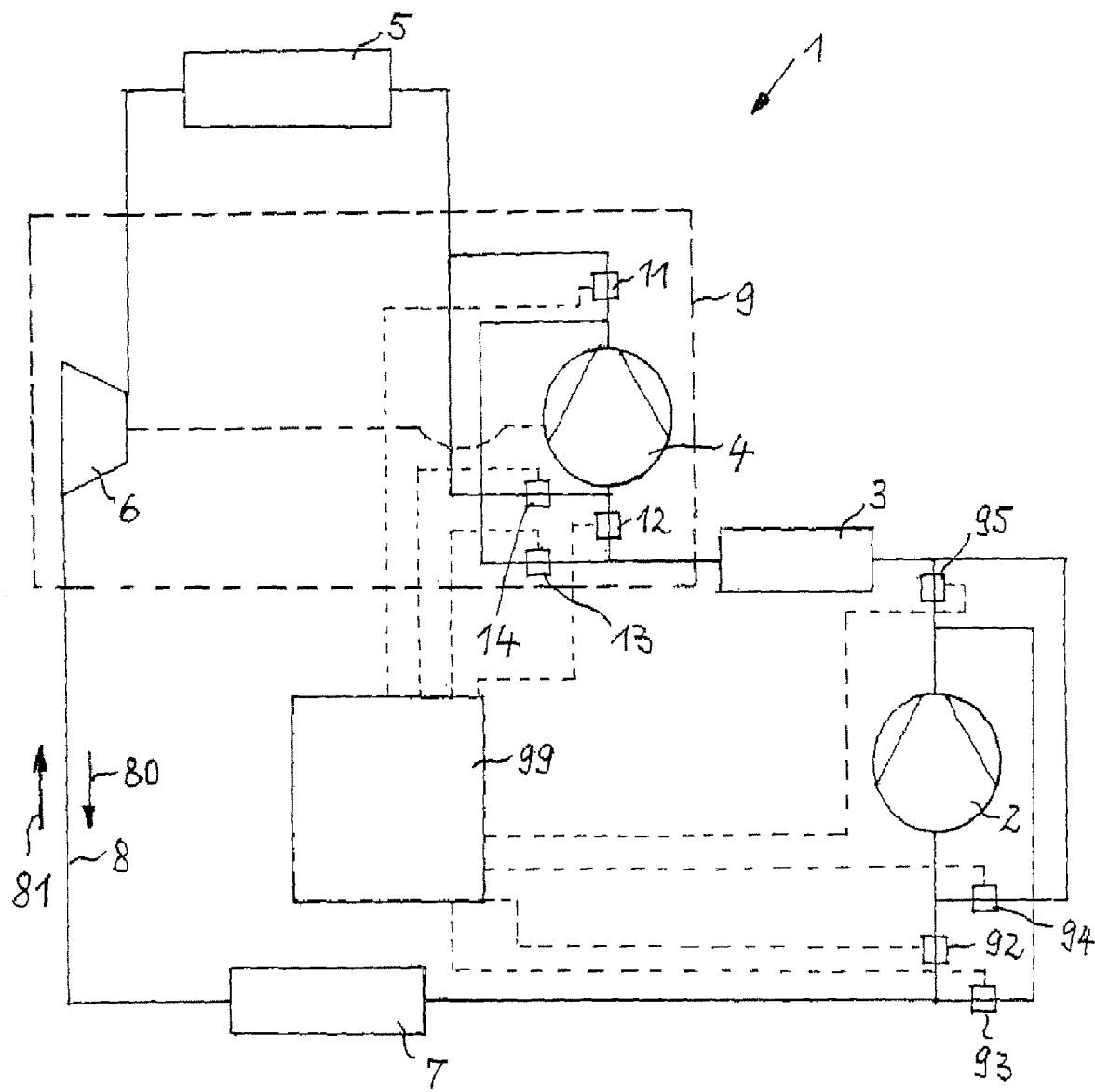
FIG. 1 is a schematic representation of an air conditioning unit with an expansion-compression machine.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

Figure 3:
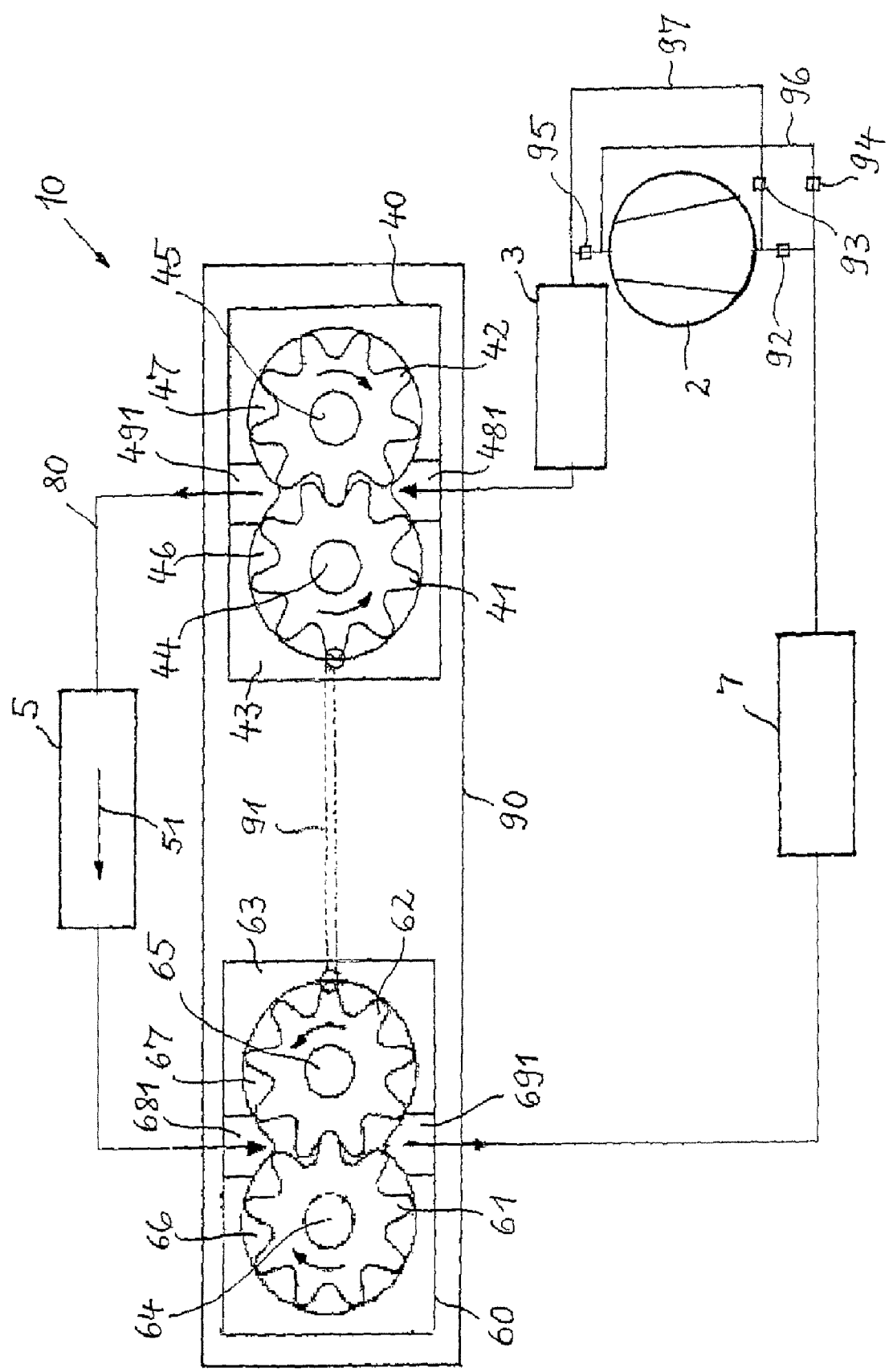
FIG. 3 is a schematic representation of the air conditioning unit with an expansion-compression machine according to the invention in the refrigeration circuit.
Figure 4:
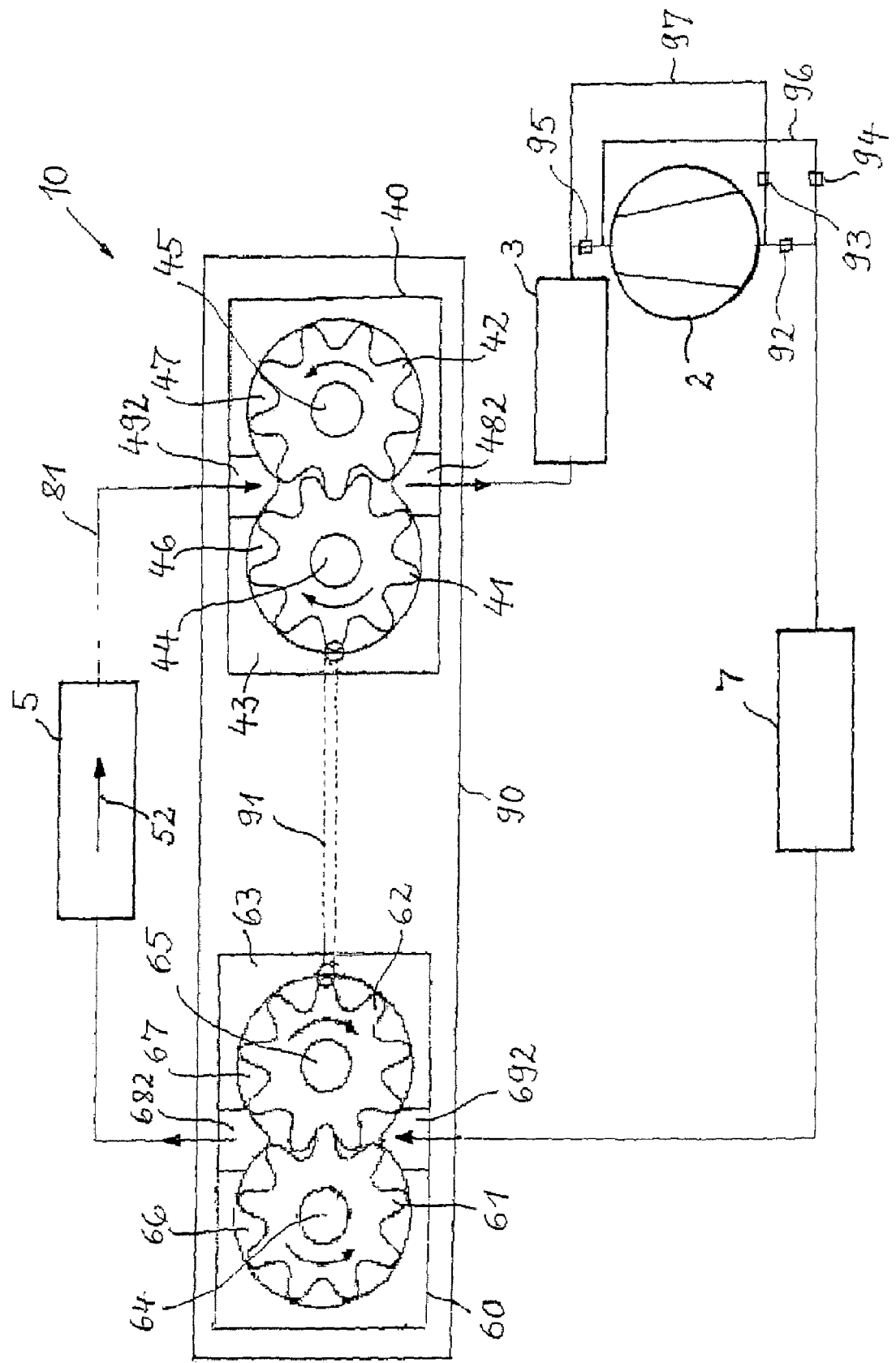
FIG. 4 is a schematic representation of the air conditioning unit with an expansion-compression machine according to the invention in the heat pump circuit.

In the following, the FIGS. 1,3,4 are considered largely in common, whereby in FIG. 1 the air conditioning unit 1 according to the invention is shown and in FIGS. 3,4 the use of toothed gear machines is provided.

The air conditioning units 1,10 operatable with carbon dioxide, with work-doing expansion of the carbon dioxide, the energy of which serves to compress the carbon dioxide in a second compression stage, include at least a main compressor 2 to compress from low pressure to medium pressure in form of a first compression stage, a first external heat exchanger 3, a subsidiary compressor 4,40 to precompress from medium pressure to high pressure in form of the second compression stage, a second external heat exchanger 5, an expansion machine 6,60, and an internal heat exchanger 7, which are, in this order, connected to each other to a circuit 8,80 working in refrigeration mode, whereby the expansion machine 6,60 and the subsidiary compressor 4,40 form an expansion-compression machine 9,90, whereby the air conditioning unit 1,10 is configured switchable concerning circuits passed by carbon dioxide in opposite directions—the refrigeration circuit 8,80 and a heat pump circuit 81—, whereby Changing flow passage depending on the respective circuit 8,80,81 specified is assigned to the expansion machine 6,60, whereby inlet and outlet are exchanged depending on the respective passage, Changing flow passage depending on the respective circuit 8,80,81 specified is assigned to the subsidiary compressor 4,40, which is driven by the expansion machine 6,60, whereby inlet and outlet are exchanged depending on the respective passage, Different pressure levels are assigned to the first external heat exchangers 3,5 depending on the circuit specified, and whereby an assigned volume/density ratio of compression to expansion within the expansion-compression machine 9,90 is specified.

Figure 2:
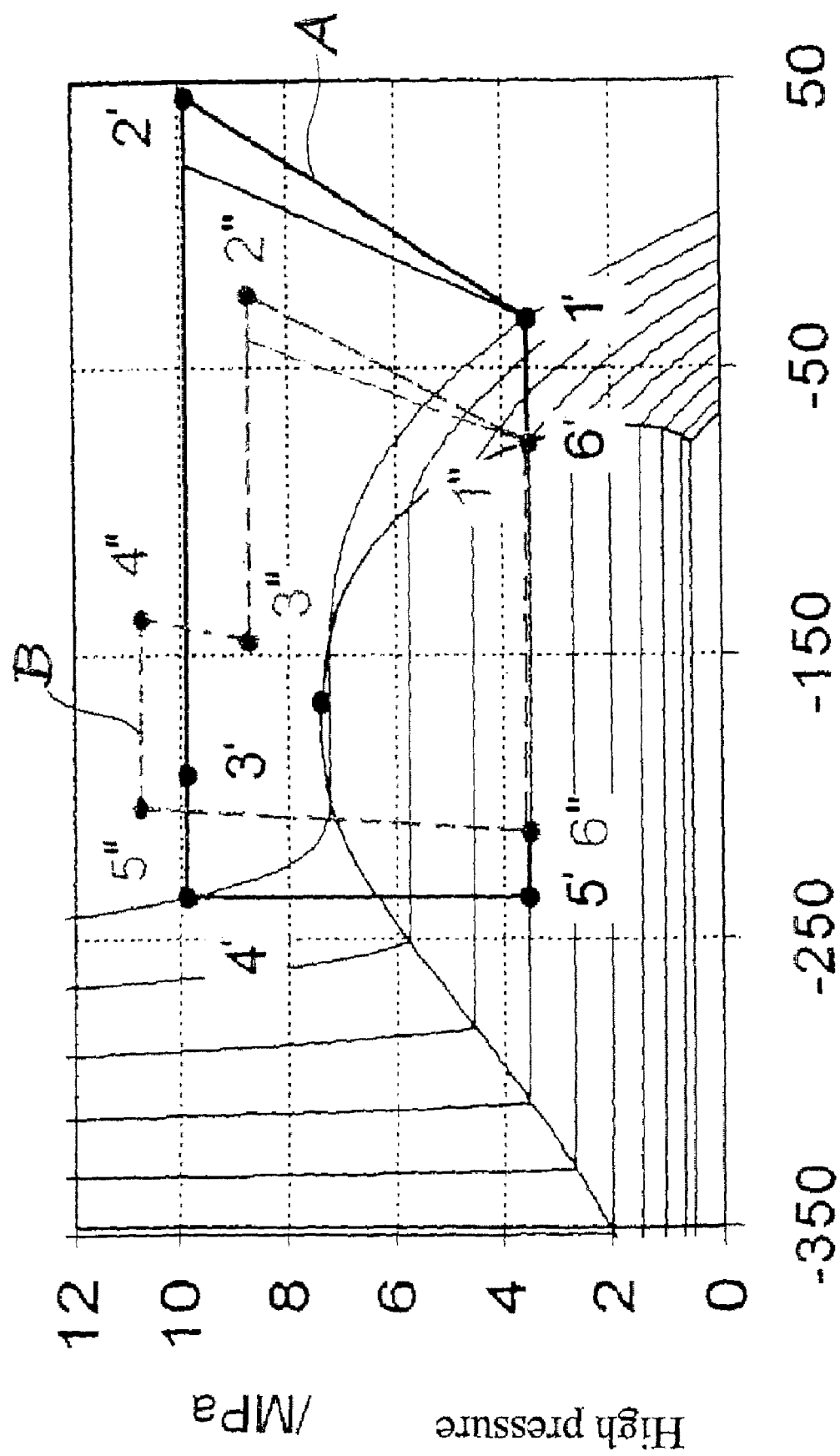
FIG. 2 depicts two high-pressure/enthalpy diagrams A, B for an air conditioning unit with a first compressor stage A and an additional second compressor stage B.

In FIG. 2, the processes in a refrigeration circuit 8,80 are exemplarily shown by means of a first pressure/enthalpy diameter process A (solid lines). For the process course shown, the point 1" is on the saturation line (x=1) of the two-phase region. From point 1' to point 2' the carbon dioxide is compressed in the main compressor 2 while supplying mechanical and/or electrical driving power. At point 2' the carbon dioxide is in the supercritical region, which it does not leave even when it flows through the gas cooler/liquefier 3 and, in this example, is subjected to an isobaric state change until point 3' is reached releasing a heat flow. From point 3' to point 4', further compression is carried out in the supercritical region, by the second compressor stage, which comprises the subsidiary compressor 4 and the expansion machine 6. During the state change from point 4' to point 5', again a heat flow is released. From point 5' on, the carbon dioxide is expanded in a toothed gear machine 6, which has been exemplarily established (rotating/oscillating piston machines are also conceivable, particularly a rotational piston machine with inner shaft), to the wet steam region until point 6', thereby releasing mechanical energy. From point 6' to point 1', the carbon dioxide passes through the internal heat exchanger 7 in form of an evaporator where the carbon dioxide takes heat.

In the FIGS. 3 and 4, the expansion machine 60 and the subsidiary compressor 40 are configured as two-shaft expansion-compression machine 90 with the shafts 64,65 and 44,45, whereby both the expansion machine 60 and the subsidiary compressor 40 have the form of two toothed gears 61,62 and 41,42 engaging to each other by their teeth, in a casing 63 and 64 in each case, so that opposite directions of rotation are obtainable depending on the specified direction of the flow passing the circuit, whereby the gears 61,62 and 41,42 are included in partial cylinder spaces 66,67 and 46,47 of the casing 63 and 64. Further, an inner shaft rotational piston machine is conceivable.

All further descriptions apply to other design types of machines. The expansion machine 60 and subsidiary compressor 40 present in the expansion-compression machine 90 can preferably by connected to each other over a common shaft 91.

As to the dimensions and the volume ratios, the expansion machine 60 and the subsidiary compressor 40 can potentially be configured different concerning the volume design:

1. The expansion-compression machine 90 between the expansion machine 60 and the subsidiary compressor 40 can be established as a combination of an expansion machine 60 working to the full pressure principle (displacement work only) and a subsidiary compressor 40 also working to the full pressure principle, as shown in FIGS. 3 and 4.
2. The expansion-compression machine 90 between the expansion machine 60 and the subsidiary compressor 40 can be established as a combination of an expansion machine 60 or subsidiary compressor 40, working to the full pressure principle using additional displacement work.
3. The expansion-compression machine 90 between the expansion machine 60 and the subsidiary compressor 40 can be established as a combination of an expansion machine 60 working to the full pressure principle and a subsidiary compressor 40 working to the full pressure principle using additional displacement work.
4. The expansion-compression machine 90 between the expansion machine 60 and the subsidiary compressor 40 can be established as a combination of an expansion machine 60 working to the full pressure principle using additional displacement work and a subsidiary compressor 40 working to the full pressure principle.

In all cases, the expansion-compression machine 90 between the expansion machine 60 and the subsidiary compressor 40 can be established as a common machine with one casing including both assemblies 60 and 40.

Between the internal heat exchanger 7, the main compressor 2 and the first external heat exchanger 3, feeding lines 96,97 are provided which, depending on the establishment and use provided—refrigeration circuit 80 and/or heat pump circuit 81, can be provided with valves, optionally with controllable valves 92,93,94,95 so that, depending on refrigeration circuit 80 or heat pump circuit 81 of the air conditioning unit 10, a circuit-related directed flow passing through the main compressor 2 is adjustable, whereby the valves 92,93, 94,95 are connected, at least communicatively, to a controlling apparatus 99 for switching of the circuits, as shown in FIG. 1.

The valves 11,12,13,14 indicated in FIG. 1 can, for the heat pump circuit 81, be assigned to the subsidiary compressor 4 for switching over from the refrigeration circuit 8 to the heat pump circuit 81, and be particularly provided if the expansion-compression machine 9,90 is not structured of toothed gear machines. All valves 11,12,13,14;92,93,94,95 can optionally be supported by the controlling apparatus 99.

In the refrigeration circuit 80 of the air conditioning unit 10, as shown in FIG. 3, the toothed gear machine of the subsidiary compressor 4 is provided with an inlet 481 and an outlet 491, and the toothed gear machine of the expansion machine 60 is provided with an inlet 681 and an outlet 691.

However, in the heat pump circuit 81 of the air conditioning unit 10, as shown in FIG. 4, the toothed gear machine of the subsidiary compressor 4 is provided with the inlet 492 and the outlet 482 and the toothed gear machine of the expansion machine 6 is provided with the inlet 692 and the outlet 682, whereby the original inlets and outlets of each toothed gear machine 43,63 changed their functions.

In the following, the function of the air conditioning unit 10 in the refrigeration circuit 80 to FIG. 3 and in the heat pump circuit 81 to FIG. 4 is explained in greater detail. The flow course of the carbon dioxide refrigerant in the circuit 80 is first shown in the refrigeration circuit 80 to FIG. 3, whereby the carbon dioxide flows in direction of arrow 51 and the following steps are made:

Compression of the carbon dioxide by means of a drive of the main compressor 2,

Passage of the compressed carbon dioxide through the first external heat exchanger 3, which works as medium-pressure gas cooler, releasing heat, Passage of the compressed carbon dioxide through the subsidiary compressor 40, which is driven mechanically by the expansion machine 60 and works as compressor in the second compression stage, Passage of the compressed carbon dioxide through the second external heat exchanger 5, which works as high-pressure gas cooler, Passage of the compressed carbon dioxide through the expansion machine 60, where the expansion occurs which is directly used work-doing to drive the subsidiary compressor 40, Passage of the compressed carbon dioxide through the internal heat exchanger 7, which works as evaporator.

In the heat pump circuit of the air conditioning unit 10, the flow course of the carbon dioxide according to the direction of arrow 52 in the circuit 81 is shown in FIG. 4, whereby the direction of flow is opposite to the direction of flow in the refrigeration circuit. In the heat pump circuit the air conditioning unit 10 is switched as heat pump. The following steps are made:

Compression of the carbon dioxide by means of a drive of the main compressor 2, which as part of the first compression stage has the same function as in the refrigeration circuit and where the same direction of flow of the carbon dioxide exists as in the refrigeration circuit, Passage of the compressed carbon dioxide through the internal heat exchanger 7 in direction opposite to the refrigeration circuit, which works as heater, Passage of the compressed carbon dioxide through the expansion machine 60 in opposite direction, with changed inlet and outlet, whereby in the expansion machine 60 also expansion occurs which is directly used work-doing to drive the subsidiary compressor 40, Passage of the compressed carbon dioxide through the second external heat exchanger 5, which works as low-pressure evaporator taking heat from the environment, Passage of the compressed carbon dioxide through the subsidiary compressor 40, which works as compressor for the first compression stage in the two-phase region, Passage of the compressed carbon dioxide through the first external heat exchanger 3, which works as medium-pressure compressor and also takes heat from the environment.

In both circuits 8,80 and 81, the inlet and the outlet of the expansion machine 60 change because the carbon dioxide flow changes direction. Also both external heat exchangers 3, 5 work at different pressure levels in both operational modes, whereby in the refrigeration circuit 8, 80, the first external heat exchanger 3 works as medium-pressure gas cooler taking heat from the environment, while in the refrigeration circuit 8,80, the second external heat exchanger 5 works as high-pressure gas cooler releasing heat into the environment, and in the heat pump circuit 81, as low-pressure evaporator taking heat from the environment.

Summarizing, the expansion-compression machine 90 is passed in alternate directions depending on the circuit 80 or 81 provided, whereby depending on the operational mode the respective inlets and outlets change function, both external heat exchangers 3,5 depending on the operational mode set to different pressure levels, and the subsidiary compressor 4 is passed in alternating directions depending on the circuit 80,81, whereby depending on the operational mode, the inlet and outlet also change function.

In an embodiment of an expansion-compression machine 90, as shown in FIGS. 3 and 4, the toothed gear 61 is connected with the toothed gear 42 by means of a shaft so that the opposite direction of rotation can be achieved.

Figure 5:
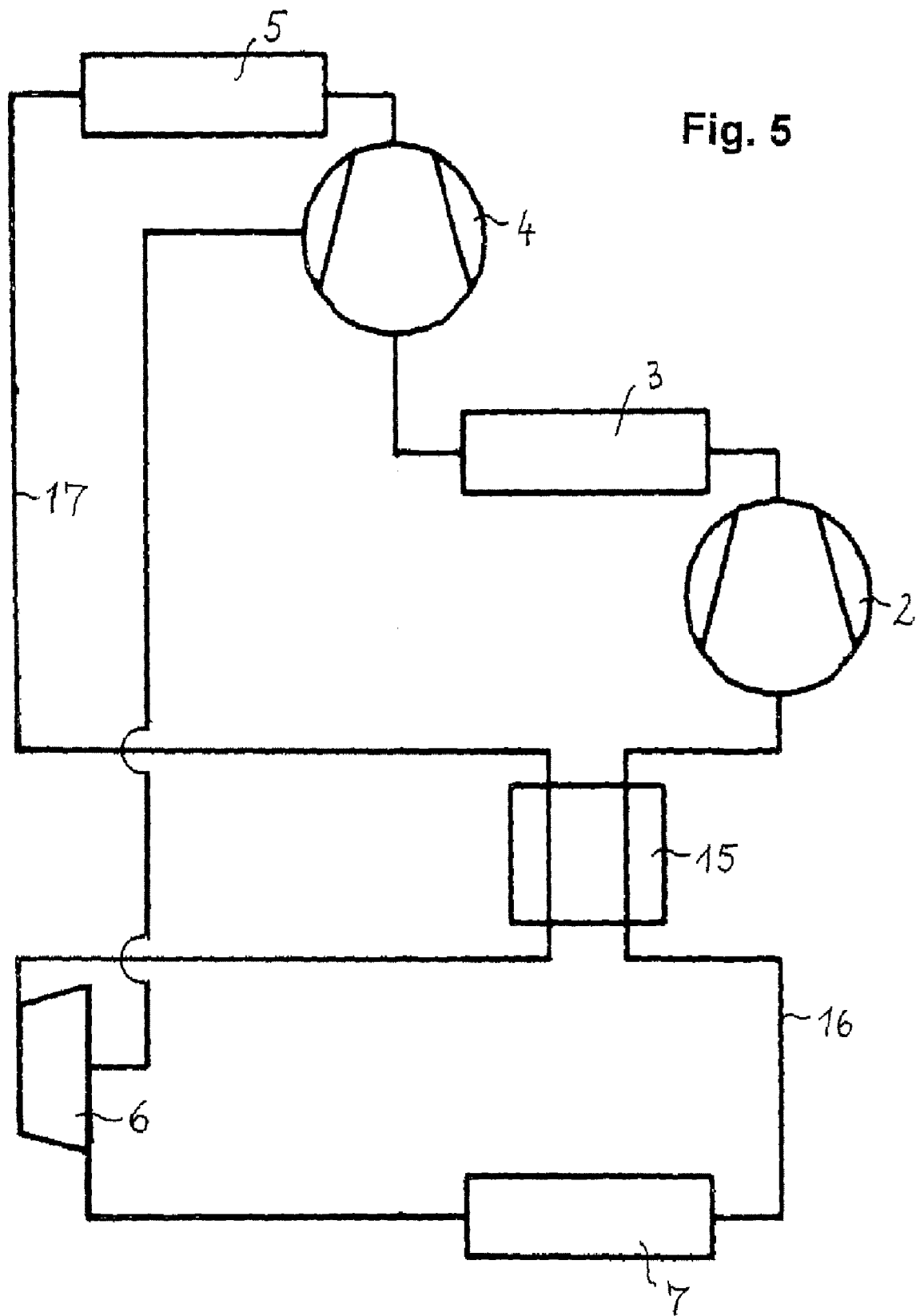
FIG. 5 is a schematic representation of the air conditioning unit to FIG. 1 with an inner heat exchanger (IHX)

The air conditioning unit can optionally, as shown in FIG. 5, be completed by an IHX 15 which, on the one side, can be integrated into the line train 16 between the main compressor 2 and the internal heat exchanger 7 and, on the other hand, can be integrated into the line train 17 between the second external heat exchanger 5 and the expansion machine 6, 60. Hereby, an efficiency of the IHX is aimed at to have a value from the range of between 5 and 50%, distinctly below current $CO_2$-units. Compared with the process B, the internal heat exchanger is preferably intended to reduce the mass flow a little. In the process B, the IHX is intended to provide the required refrigeration capacity at high ambient temperatures and significantly reduce the optimal high pressure at maximum coefficient of performance.

In order to ensure the function of the air conditioning unit 1, 10, the expansion-compression machine 90 is adjusted to the process parameters—temperature and refrigerant flow. These parameters differ clearly, if automobile air conditioning units and stationary units are distinguished. For example, the ambient temperature for air conditioning units can vary in the range from 5 to 70° C.

Therefore, it is useful for the entire operational range of the air conditioning unit 10 of a vehicle to find/specify a volume/density ratio between compression and expansion that enables efficient operation at acceptable operational conditions. Important parameters are the achievable coefficient of performance (COP), or its deviation from the maximum possible $COP_{max}$, respectively, as well as an acceptable high pressure in the region of the maximum high pressure of vehicle air conditioning units, cf. FIGS. 5 and 6.

In an experimental example, calculations for evaporation temperatures of 0° C. and 10° C. have been made. The efficiency of the compression of the first compressor stage 2 and second compressor stage 90 and of the expansion machine 60 is 70%. In addition, on the expansion side the efficiency of the full pressure principle has been taken into consideration, compared with a complete isentropic expansion. The technical work produced by the expansion machine 60 corresponds to the technical work required of the compression of the second stage 90. The optimum medium and high pressure in the first external heat exchangers 3, 5 is chosen such that the maximum possible coefficient of performance at the volume/density ratio chosen can be calculated.

Figure 6:
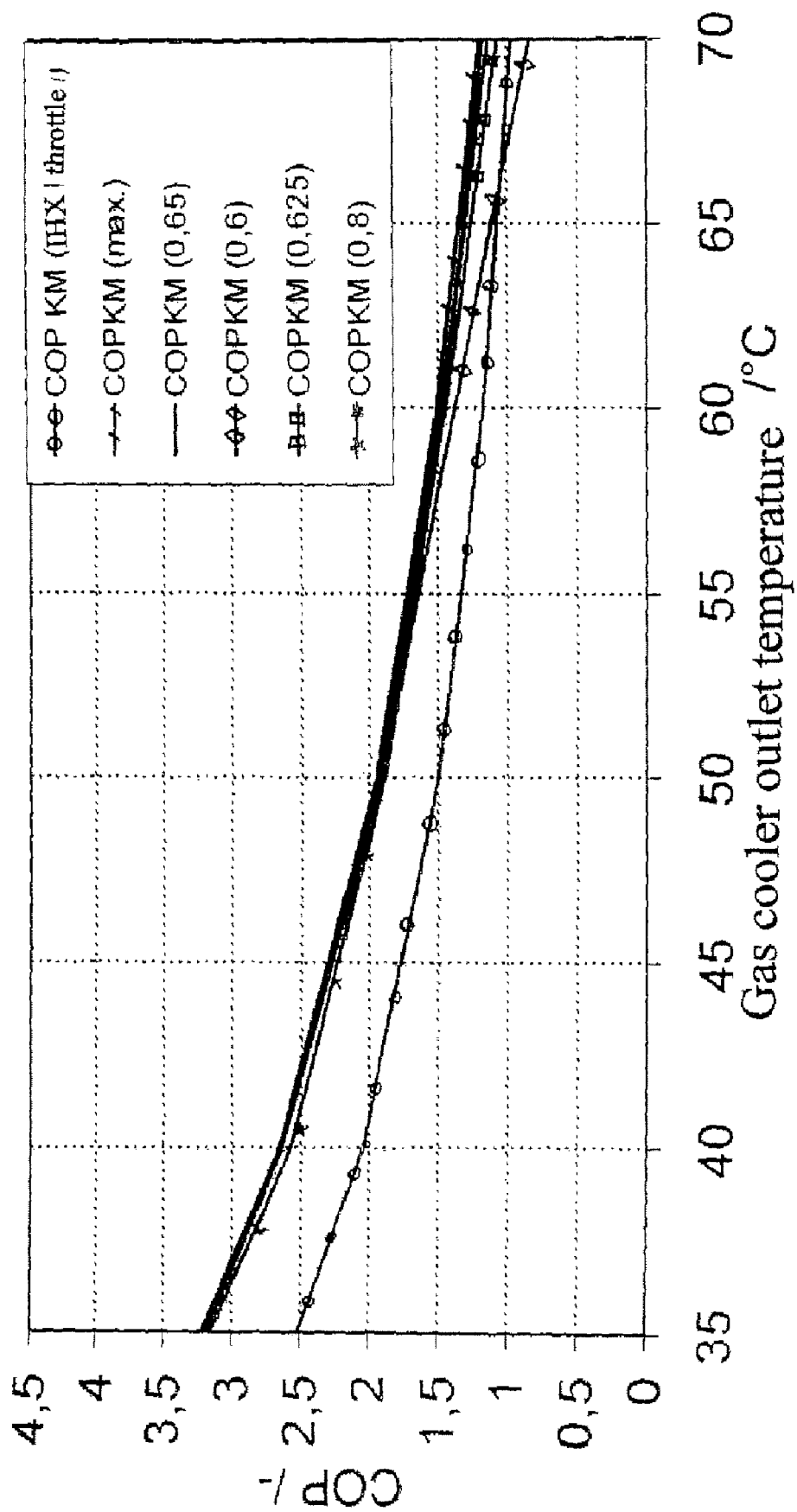
FIG. 6 is a coefficient of performance (COP)/gas cooler outlet temperature diagram for an air conditioning unit.
Figure 7:
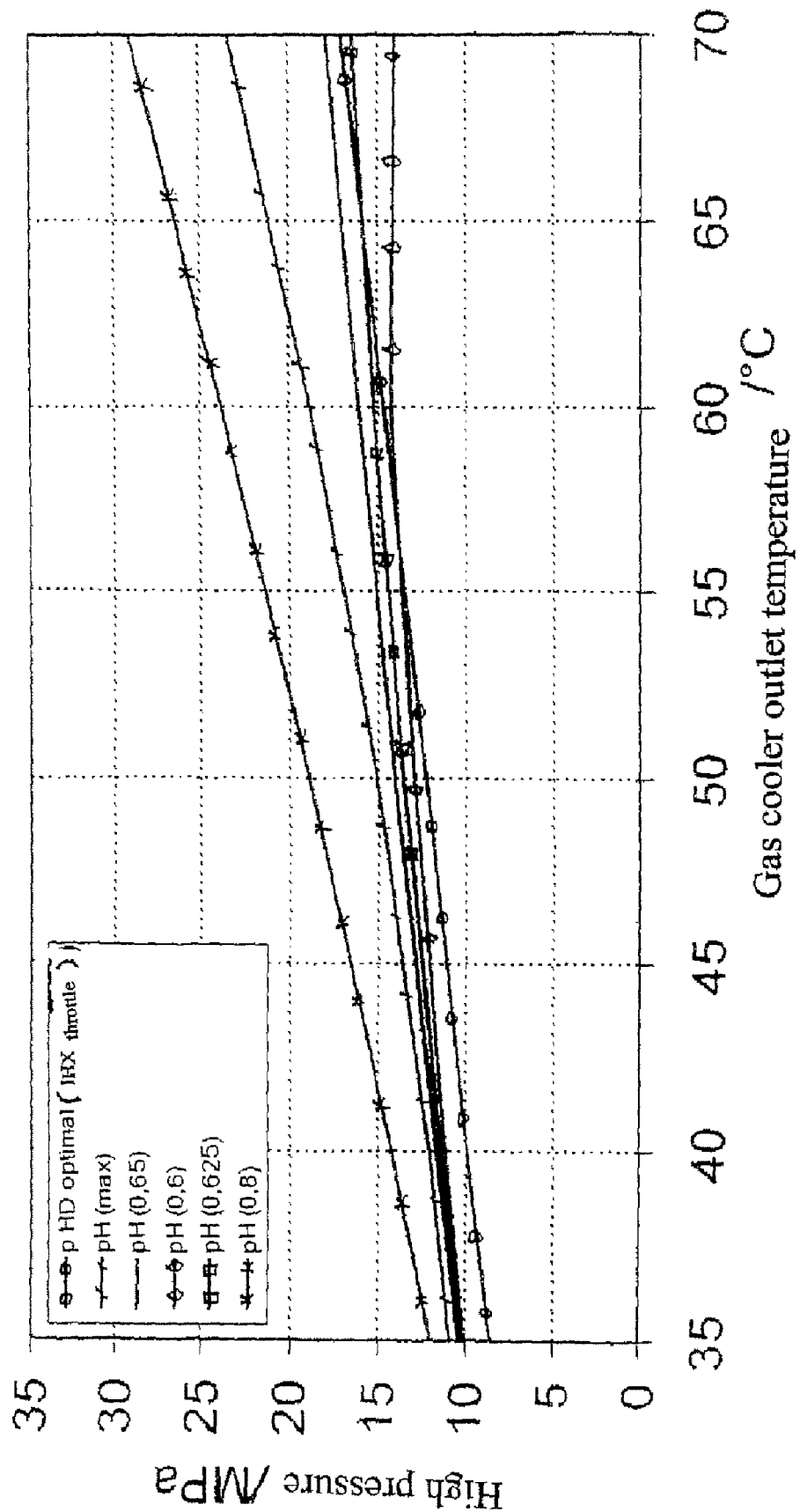
FIG. 7 is a high-pressure gas cooler outlet temperature diagram for the air conditioning unit.

As bases, in FIG. 6 the coefficient of performance, in FIG. 7 the optimum high pressure of the one-stage process (COPKM (internal heat exchanger, throttle) with internal heat exchanger 7 is recorded in the FIGS. 6 and 7. As COP-value, the value of the ratio is defined of the refrigeration output to the mechanical and/or electrical power input inclusive of the auxiliary energy at specified ambient temperature conditions.

In the supercritical part of the refrigeration circuit the following applies: For the expansion-compression process, the maximum possible coefficient of performance (COPKM (max)) is recorded in FIG. 6. The density ratio between expansion and compression is not constant (range of 0.69 to 0.78). When configuring an expansion-compression machine, a constant density ratio is to be found for the operational parameters chosen to provide efficient and reliable operation. For a constant density ratio, further curves are indicated (COPKM (0.6), (0.625) and (0.8)). The calculated high pressures of the density ratio 0.6 to 0.675 are distinctly below the optimum high pressures at the maximum coefficient of performance, as shown in FIG. 7 by the high-pressure gas cooler outlet temperature diagram. The calculated high pressures of the density ratio 0.8 are higher. The deviations of the coefficient of performance, compared with the maximum achievable coefficient of performance, are within an acceptable range. For an operation of the expansion-compression machine 90 at high pressures in vehicle air conditioning units 10, the density ratios below the maximum coefficient of performance are to be taken into consideration, particularly for the density ratio 0.6 to 0.675, because in this range stable operating points could be calculated.

In subcritical air conditioning operation, the density ratio for supercritical operation is adopted. For subcritical operation, the expansion-compression machine 90 (expansion and/or compression) can have operating points located in the two-phase region.

In the subcritical and/or supercritical heat pump circuit 81, for complete condensation with/without subcooling of the carbon dioxide, due to the density of the carbon dioxide the chosen density ratio cannot be achieved. Any carbon dioxide flow variations can be checked by means of a second expansion and/or compression stage. Also throttling cross-sections may be established.

Preferably, the density change (ratio of inlet to outlet density) of the carbon dioxide in the subsidiary compressor 40 can have the ratio 1.0 to 1.3; particularly 1.05 to 1.20, more particularly 1.08 to 1.15, which particularly applies for the subsidiary compressor 40 with and, especially, without change of the inner volume.

The density/area ratio between compression/expansion can have values of 0.40 to 0.54 and 0.55 to 0.8 for a supercritical operation of 30° C. to 70° C. gas cooler outlet temperature, particularly 0.6 to 0.675.

In this case, the second compression stage 90 can also work in the two-phase region.

Generally, the second compressor stage works with the expansion-compression machine 90 according to the invention, as shown in the high-pressure/enthalpy diagram B of FIG. 2.

It is also possible for the subcritical refrigeration circuit 8,80 to adopt the density ratio of the supercritical process course.

In the heat pump circuit 81, in addition to the existing expansion-compression stage 60, a second expansion, or compression stage, respectively, or both may be useful, which measure is also an option for the subcritical operation, whereby the options are series or parallel circuits to achieve improved control, or coefficient of performance, also in the supercritical region.

Further, the control of the carbon dioxide refrigerant inflow, or outflow, respectively, can be carried out by a feed valve (not drawn) arranged upstream or downstream.

The expansion-compression machine 90 can be configured such that it can also work independent of the main compressor 2.

During operation in each case, the external heat exchanger 3,5 can be split into a medium-pressure and high-pressure part.

The invention makes possible to avoid noise development in the vehicle interior during expansion at the gas cooler. For any noise, a hose or corresponding pipeline layout can ensure decoupling.

Another advantage of the invention is that the expansion-compression machine 90 according to the invention can work in both the refrigeration circuit 80 and the heat pump circuit 81.

The design of the compression can be equal to or different from the design of the expansion.

Within the process, also internal heat transmission is possible.

The invention enables the work-doing expansion to function completely, incompletely or to the full pressure principle.

For the combination of subsidiary compressor 40 and expansion machine 60 in an expansion-compression machine 90, the following advantages can result:

As the inlets and outlets of the expansion-compression machine 90 can be exchanged, while the machine still works, the subsidiary compressor 40 can work both as compressor and expansion machine, whereby the same applies for the expansion machine 60 which can work both as expansion machine and compressor, which is adjusted by realization using, for example, a combined toothed gear machine 40-60 or other rotating/oscillating machine which block the working space—partial cylinder space—(for the toothed gear machine, that is the volume surrounding the toothed gears) by rotation, or oscillation, respectively, and by a specified density ratio between compressor/expansion machine such that the operation can be carried out as mentioned above.

During the respective operation, the external heat exchanger can be split into a medium-pressure and high-pressure part.

For the external heat exchanger, it further results that due to the low compression final temperatures especially after the second compression stage, the heat is not released to the ambient air, but is integrated into low-pressure or high-pressure refrigeration circuits provided in future automobiles. The following scenarios are conceivable:

a) 3 in the high-temperature circuit and 5 in the low-temperature circuit,
b) 3 and 5 in the low-temperature circuit,
c) 3 and 5 in the high-temperature circuit,
d) 3 in the low-temperature circuit and 5 in the high-temperature circuit.

Also the transmission of the heat to the ambient air in the heat exchanger 3 (and/or 5) and the transmission of the heat to a refrigeration circuit in each other heat exchanger 3 (and/or 5) are conceivable.

It results for the configuration of the expansion-compression machine that the machine can be placed as a compact unit, relatively independently in the engine compartment, preferably near to the evaporator unit, combined only with the high-pressure heat exchanger.

The invention offers a potential for enhancing the coefficient of performance of the air conditioning unit 10 and reducing the carbon dioxide output, while the air conditioning unit 10 can be configured more cost-effective and compact.

While certain representative embodiments and details have been shown for purposes of illustrating the invention, it will be apparent to those skilled in the art that various changes may be made without departing from the scope of the disclosure, which is further described in the following appended claims.

What is claimed is:

1. An air conditioning unit comprising:
    a combined refrigeration and heat pump circuit, wherein the air conditioning unit is switchably configured to change a flow direction of a refrigerant for switchable operation from the refrigeration circuit to the heat pump circuit, the refrigeration and heat pump circuit further comprising:
    at least a main compressor adapted for a compression of the refrigerant from a low pressure to a medium pressure in a first compression stage;
    a first external heat exchanger in fluid communication with the main compressor;
    a subsidiary compressor in fluid communication with the first external heat exchanger and adapted for a compression of the refrigerant from the medium pressure to a high pressure in a second compression stage, an inlet and an outlet of the subsidiary compressor exchanged depending on the refrigeration and heat pump circuit desired;
    a second external heat exchanger in fluid communication with the subsidiary compressor, wherein different pressure levels are assigned to the external heat exchangers depending on the refrigeration and heat pump circuit desired;
    an expansion machine in fluid communication with the second external heat exchanger, wherein the expansion machine and the subsidiary compressor form an expansion-compression machine, an inlet and an outlet of the expansion machine exchanged depending on the refrigeration and heat pump circuit desired, and wherein an assigned volume/density ratio of the compression to the expansion within the expansion-compression machine is prespecified; and
    an internal heat exchanger providing fluid communication between the expansion machine and the main compressor,
    wherein the expansion compression machine is adapted to operate in at least one of the following manners: the expansion machine is adapted to work at a full pressure and the subsidiary compressor, in addition to a displacing work, is adapted to be loaded with a volume changing work; the expansion machine is adapted to be loaded with a displacing work and a volume changing work, and the subsidiary compressor is adapted to work at the full pressure; both the expansion machine and the subsidiary compressor are adapted to work at the full pressure; and both the expansion machine and the subsidiary compressor are adapted to be loaded with a displacing work and a volume changing work.

2. The air conditioning unit of claim 1, wherein the air conditioning unit includes at least one of a second expansion-compression machine and a second expansion machine.

3. The air conditioning unit of claim 1, wherein the internal heat exchanger is an evaporator in the refrigeration circuit and is a heater in the heat pump circuit.

4. The air conditioning unit of claim 1, wherein the internal heat exchanger is an evaporator in the refrigeration circuit and the heat pump circuit, the heat pump circuit further including a heater disposed parallel to the internal heat exchanger.

5. The air conditioning unit of claim 1, wherein a density/area ratio at the expansion-compression machine is from about 0.4 to about 0.675, the ratio providing an expansion-compression machine with a volumetric efficiency $\lambda=1$.

6. The air conditioning unit of claim 1, wherein the subsidiary compressor and the expansion machine are configured as one of a rotating displacement machine and an oscillating displacement machine.

7. The air conditioning unit of claim 6, wherein the rotating displacement machine is a rotary piston machine with one of an inner shaft and two-shaft toothed gear machines, each having opposite directions of rotation according to a pregiven direction of flow of the refrigerant, wherein the expansion machine and the subsidiary compressor at different ambient temperatures are switchably configured with respect to the refrigerant flow direction and are provided for switchable operation between the refrigeration circuit and the heat pump circuit, and wherein the density/area ratio between the expansion machine and the subsidiary compressor is specified as desired.

8. The air conditioning unit of claim 1, wherein the main compressor and the subsidiary compressor include feeding lines having controllable valves, wherein a circuit-related flow passage of the main compressor and the subsidiary compressor are adjustable, and wherein the valves are in communication with a control device.

9. The air conditioning unit of claim 8, wherein the heat pump circuit is provided with at least one additional subsidiary compression stage in the expansion-compression machine, the stage used for at least a supercritical operation.

10. The air conditioning unit of claim 8, wherein the heat pump circuit is provided with at least one additional subsidiary expansion stage in the expansion-compression machine, the subsidiary expansion stage used for at least a supercritical operation, whereby both expansion-compression machines form at least one of a series and parallel circuit.

11. The air conditioning unit of claim 8, wherein the heat pump circuit is provided with additional throttling cross-sections that are parallel to at least one of an expansion stage and a subsidiary compressor stage in the expansion-compression machine, which are used for at least a supercritical operation.

12. The air conditioning unit of claim 1, including an inner heat exchanger (IHX) integrated into a line train between the main compressor and the internal heat exchanger; and integrated into a line train between the second external heat exchanger and the expansion machine.

13. A method for operating an air conditioning unit having a main compressor, a first external heat exchanger, a subsidiary compressor, a second external heat exchanger, an expansion machine, and an internal heat exchanger in communication with each other and forming a refrigeration circuit and a heat pump circuit, the method comprising at least one of:

operating the refrigeration circuit, wherein the operation include the steps of:
1) compressing the carbon dioxide by means of the drive of the main compressor;
2) passing the compressed carbon dioxide through the first external heat exchanger, which works as a medium-pressure gas cooler releasing heat;
3) passing the carbon dioxide through the subsidiary compressor, which is driven by the expansion machine and, in the second compression stage, works as a compressor;
4) passing the carbon dioxide through the second external heat exchanger, which works as a high-pressure gas cooler;
5) passing the carbon dioxide through the expansion machine, where the work-doing expansion occurs which is directly used to drive the subsidiary compressor; and
6) passing the carbon dioxide through the integrated internal heat exchanger, which works as evaporator; and operating the heat pump circuit, wherein the operation includes the steps of:
1) compressing the carbon dioxide by means of the drive of the main compressor;
2) passing the compressed carbon dioxide through the internal heat exchanger in opposite direction compared to a direction of flow through the refrigeration circuit, wherein the internal heat exchanger operates as a heater;
3) passing the carbon dioxide through the expansion machine in opposite direction compared to the direction of flow through the refrigeration circuit, whereby inlet and outlet are exchanged and also in the expansion machine an expansion occurs, which is directly used work-doing to drive the subsidiary compressor;
4) passing the carbon dioxide through the second external heat exchanger, which works as a medium-pressure evaporator;
5) passing the carbon dioxide through the subsidiary compressor, which works as a precompressor for a first stage in a two-phase region; and
6) passing the carbon dioxide through the external heat exchanger, which works as low-pressure evaporator and also takes heat from the environment.

14. The method of claim 13, wherein the inlet and the outlet of the expansion machine, because of a changed direction of the carbon dioxide flow, the two external heat exchangers in both the refrigeration and heat pump circuits work at different pressure levels, wherein the first external heat exchanger, in the refrigeration circuit works as a medium-pressure gas cooler which releases heat to an environment, and in the heat pump circuit works as a medium-pressure evaporator which takes heat from the environment, and wherein the second external heat exchanger, in the refrigeration circuit works as a high-pressure gas cooler which releases heat to the environment, and in the heat pump circuit works as a low-pressure evaporator which takes heat from the environment.

15. The method of claim 13, wherein a change of a ratio of an outlet density to an inlet density of the carbon dioxide in the subsidiary compressor is from about 1.0 to about 1.3.

16. The method of claim 15, wherein a volume/density ratio between compression and expansion is from about 0.40 to about 0.8 for a supercritical operation at a gas cooler outlet temperature of between about 30° C. to about 70° C., wherein values for an expansion-compression machine with a volumetric efficiency of $\lambda=1$, or corrected for an adapted expansion-compression machine with a volumetric efficiency different from $\lambda=1$, are provided.

17. The method of claim 16, wherein the volume/density ratio of the supercritical operation is adjusted in a subcritical refrigeration mode.

18. The method of claim 13, wherein the second compressor stage is also operated in a two-phase region.

19. The method of claim 13, wherein the subsidiary compressor of the expansion-compression machine is alternately operated as a compressor or as an expansion machine at the exchange of the inlet and outlet of the expansion-compression machine, and wherein the expansion machine of the expansion-compression machine is alternately operated as a compressor or as an expansion machine, the expansion machine being one of a combined toothed gear machine, a rotating machine, and an oscillating machines, wherein the volume/density ratio is adjusted such that the refrigeration circuit or the heat pump circuit is selected as desired.

* * * * *